United States Patent [19]

Hiraguri

[11] 4,402,023
[45] Aug. 30, 1983

[54] TRACKING CONTROL SYSTEM IN A MAGNETIC RECORDING AND/OR REPRODUCING APPARATUS

[75] Inventor: Seisuke Hiraguri, Yokohama, Japan

[73] Assignee: Victor Company of Japan, Ltd., Yokohama, Japan

[21] Appl. No.: 239,541

[22] Filed: Mar. 2, 1981

[30] Foreign Application Priority Data

Feb. 28, 1980 [JP] Japan .................................. 55-24406

[51] Int. Cl.³ ............................................. G11B 21/10
[52] U.S. Cl. ..................................................... 360/77
[58] Field of Search ....................... 360/77, 78, 76, 10, 360/11, 70, 73

[56] References Cited

U.S. PATENT DOCUMENTS

| | | | |
|---|---|---|---|
| 3,964,094 | 6/1976 | Hart | 360/77 |
| 4,184,181 | 1/1980 | Mijatovic | 360/77 |
| 4,189,758 | 2/1980 | Mori et al. | 360/77 |
| 4,233,637 | 11/1980 | Kubota | 360/77 |
| 4,268,874 | 5/1981 | Yamagiwa | 360/77 |

FOREIGN PATENT DOCUMENTS

| | | | |
|---|---|---|---|
| 2067793 | 7/1981 | United Kingdom | 360/77 |
| 2067599 | 8/1981 | United Kingdom | 360/77 |

OTHER PUBLICATIONS

IBM, TDB, R. E. Jansen, Phase Sensing Magnetic Recording Head, vol. 17, No. 4, Sep. 1974.

*Primary Examiner*—Alfred H. Eddleman
*Attorney, Agent, or Firm*—Louis Bernat

[57] ABSTRACT

A tracking control system is applied to a magnetic recording and/or reproducing apparatus in which magnetic heads (having gaps of mutually different azimuth angles) relatively scan a magnetic recording medium to record and/or reproduce an information signal thereon and/or therefrom. The tracking control system comprises a tracking reference signal supplying circuit for supplying a tracking reference signal to the magnetic heads so that the magnetic heads are positioned at a position where the recorded position of a tracking reference signal on both sides of the tracks adjacent to a certain track, is positioned successively shifted respectively along the track longitudinal direction with respect to the tracking reference signal recorded position at the above certain track. The magnetic head record the information signal together with the tracking reference signal. The tracking control system further comprises a discriminating circuit for discriminating the relative phase of a tracking reference signal reproduced from a reverse track which is adjacent to a normal track and recorded by a magnetic head having an azimuth angle different from that of a reproducing magnetic head, according to a tracking reference signal reproduced from the normal track which is recorded by a magnetic head having an azimuth angle identical to that of the reproducing magnetic head, tracking error signal deriving circuit for deriving a tracking error signal from the output signal of the discriminating circuit, and controlling circuit for controlling the relative scanning phase of the magnetic heads with respect to the track of the magnetic recording medium in response to the tracking error signal obtained by the tracking error signal deriving circuit. The frequency of the tracking reference signal supplied by the tracking reference signal supplying circuit is selected so that the level of the tracking reference signal reproduced from the normal track is always higher than that of the tracking reference signal reproduced from the reverse track.

8 Claims, 37 Drawing Figures

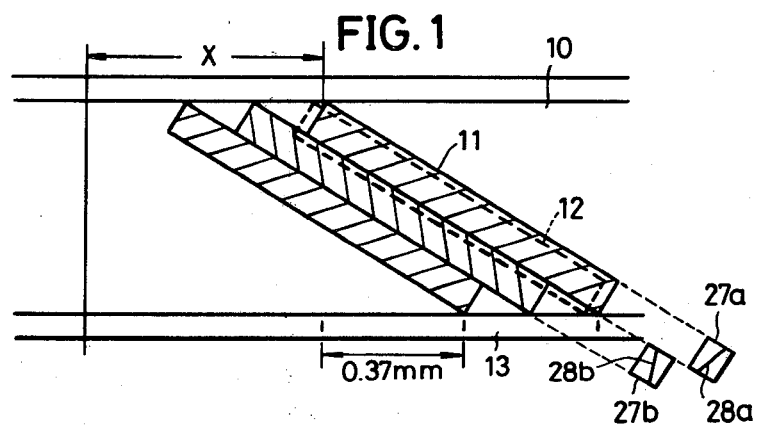
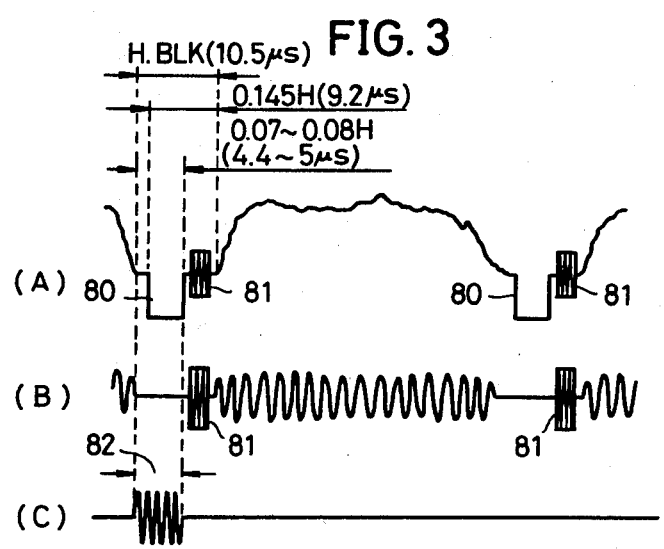
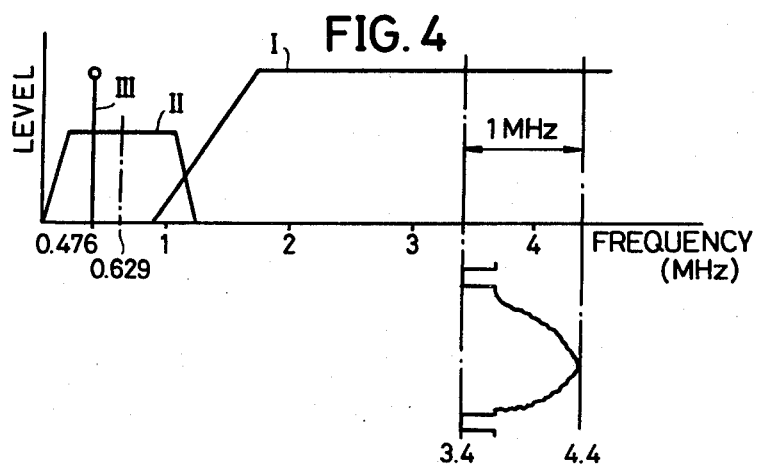

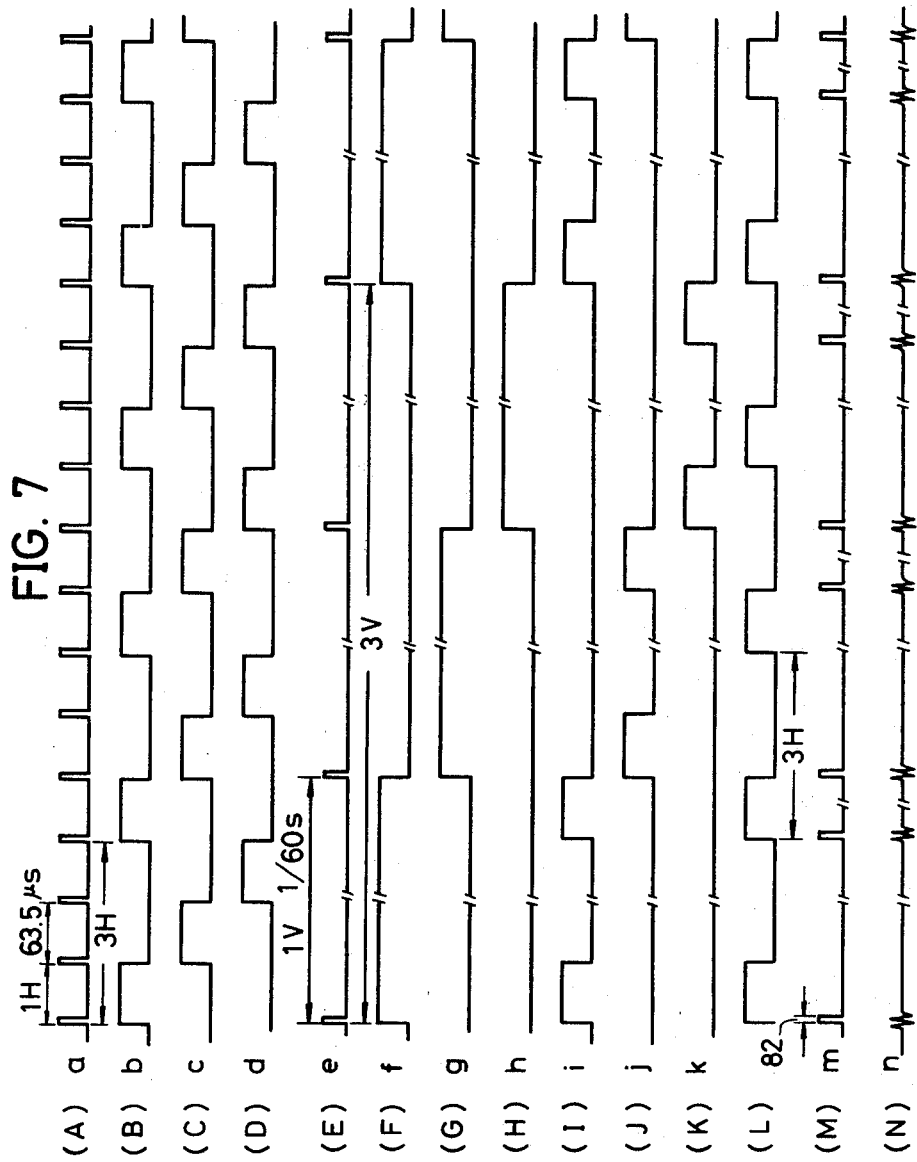

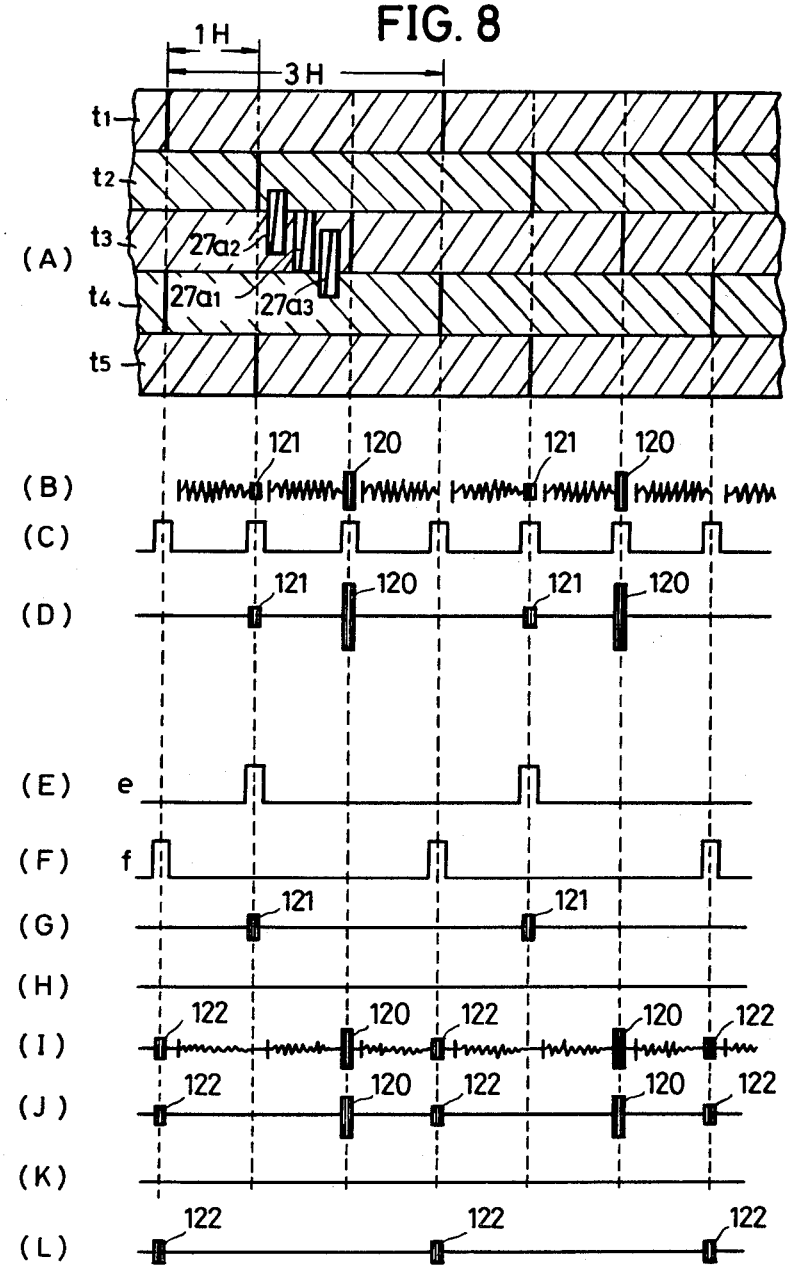

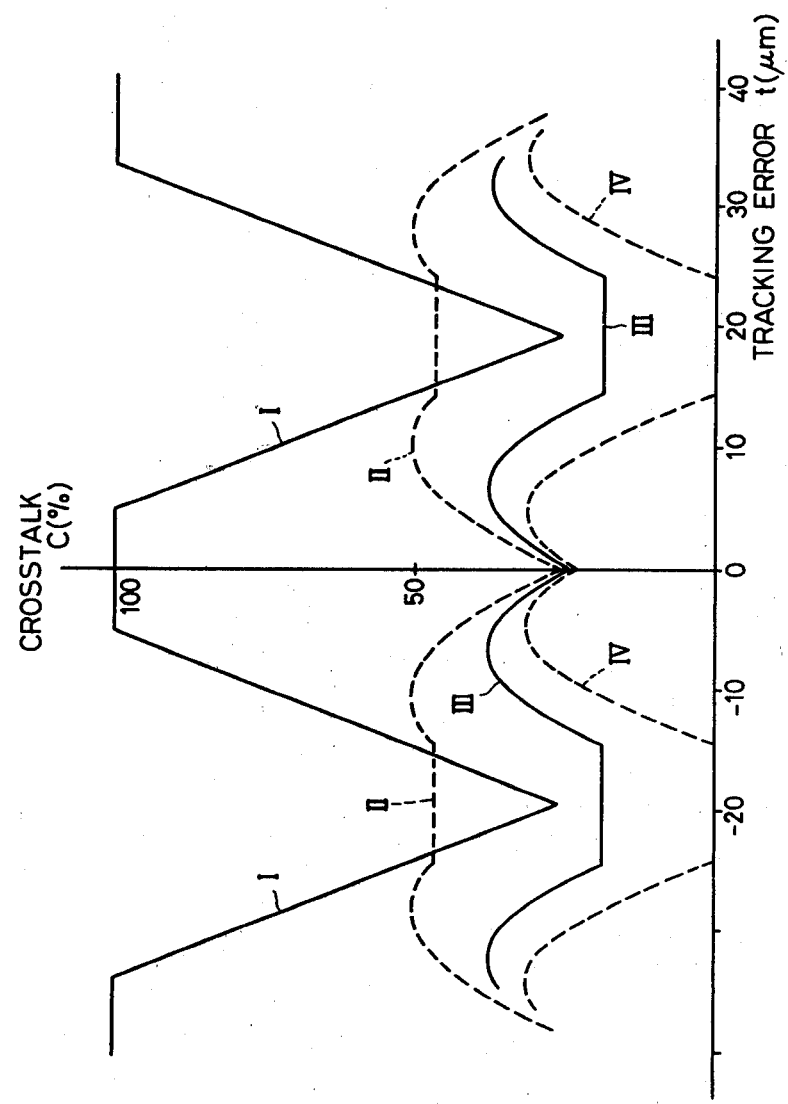

TRACKING CONTROL SYSTEM IN A MAGNETIC RECORDING AND/OR REPRODUCING APPARATUS

BACKGROUND OF THE INVENTION

The present invention relates generally to tracking control systems in magnetic recording and/or reproducing apparatuses and more particularly to a system which accomplishes tracking control in a manner such that the magnetic heads can accurately trace along a track on a magnetic tape, by accrately detecting the tracking error of the reproducing rotary magnetic head.

In recent years, in magnetic recording and/or reproducing apparatuses such as video tape recorders (VTR) of the helical scan type for home use, there has been a trend toward even higher densities of recording and reproducing, a aided by improvements in magnetic tapes. For example, by reducing the tape speed and track pitch to approximately ⅓ of their values as compared to the case of the conventional recording and/or reproducing capacity of 2 hours, for example, recording and reproducing of 6 hours can be carried out. Such long-duration recording and/or reproducing techniques are being reduced to practice. However, in the VTR for home use, in which the tape travel system is simplified in order to lower the cost, it is difficult to reproduce a magnetic tape having a reduced track pitch as mentioned above while positively maintaining the required tracking precision.

Furthermore, in a magnetic recording/reproducing apparatus capable of recording/reproducing for 2 hours, it is necessary to manipulate a tracking knob in order to cause the magnetic head to undergo accurate tracking along a track of the magnetic tape, when interchanged reproduction is performed with another apparatus. That is, in the case where there are (1) differences in the position of the control head, (2) differences in the height of the video head, and (3) skews in the video track, between the recording and reproducing apparatuses, optimal tracking state is not obtained, and hence maximum output cannot be obtained at the time of this interchanged reproduction.

For example, in the case where the distance L from the position where a video head which is mounted on the rotary drum begins to make contact with the magnetic tape to the position of the control head is longer than a standard value in the recorder, the tracking phase deviates. In this case, a control pulse is recorded by the control head at the lower edge of the magnetic tape. In a magnetic recording and/or reproducing apparatus capable of carrying out recording and reproducing of 6 hours, for example, the recording interval of the control pulse is 0.37 milli-meters, which is approximately ⅓ of the 1.11 milli-meters, obtained in the case of a conventional recording and reproducing of 2 hours.

In the case where the above distance L is not coincident with the standard value, it is necessary to adjust the tracking knob to delay the reproducing control signal by a required time to thereby carry out normal tracking. However, adjustment of the tracking knob requires an operation in which, as the reproduced picture is observed, the knob is finely adjusted in a manner such that noise is not generated, and this manipulation is complicated.

Furthermore, while the rotational control of the rotary drum and the rotating magnetic heads carried out by means of a drum servo-control by reproducing the above control pulses accomplishes a control function of a degree such as to maintain the relative positions of the corresponding positional relationship between each track and the rotating video heads, this rotational control, in the prior art, has not accomplished the functional of a so-called tracking control.

Accordingly, a new tracking control system in a magnetic recording and/or reproducing apparatus was proposed by an United States Patent Application of which assignee is the same as the assignee of the present application.

In this proposed tracking control system, there are provided recording means for recording a tracking reference signal by forming tracks together with an information signal which is to be recorded, every predetermined horizontal scanning period of the above information signal, as well as recording on a magnetic recording medium so that the tracking reference signal recording position of a certain track is at a position in front with respect to one track in the track longitudinal direction, and at a position at the rear with respect to the other track of the tracking reference signal recording position of each of the two adjacent tracks on both sides of the above certain track, discriminating means for gate-discriminating the relative phase with respect to the tracking reference signal reproduced from the above track which is to be scanned of the above tracking reference signal reproduced as cross-talk from the tracks adjacent to the above track which is to be scanned, by obtaining a gate pulse from the above tracking reference signal reproduced from the track which is to be scanned, of the signal reproduced by a magnetic head from the above magnetic recording medium, a differential amplifier which obtains a tracking error signal from the output signal of the above discriminating means, and control means for controlling the relative scanning phase of the above magnetic head with respect to the magnetic recording medium, by obtaining the average value component of the tracking error signal at each of the plurality of tracks, of the output tracking error signal of the differential amplifier. According to this proposed system, the scanning phase of the magnetic head can be controlled upon reproduction, and can employ a known servo circuit, which enables a tracking control with low cost and simple construction.

Especially upon interchanged reproduction, the troublesome operation of the tracking knob which was conventionally required is not necessary, and interchanged reproduction of high quality can be obtained positively in a stable manner, by a tracking servo loop of a closed-loop construction. Since the tracking control is performed by use of the average value component of the tracking error every plurality of tracks, the system is especially effective upon normal reproduction. Upon reproduction of a magnetic recording medium having a track pattern in which it comprises no guard band such as in azimuth recording, the system is effective because the cross-talk between the adjacent tracks can be used. Hence, desirable tracking control can be obtained upon reproduction of tracks having narrower track width for long-duration magnetic recording and/or recording of the high density type in use recently.

After further developing to reduce the above proposed system into practice, the present inventor found that there is a problem in that accurate detection of the tracking error cannot be performed in some cases. That is, at some frequencies of the tracking reference signal, the tracking reference signal of the adjacent track which should be reproduced as cross-talk is sometimes not reproduced although the tracking error exists, and furthermore, according to the tracking error, the signal level of the reference signal of the adjacent track reproduced as cross-talk sometimes becomes higher than the signal level of the reference signal reproduced from the track which is to be scanned.

SUMMARY OF THE INVENTION

Accordingly, a general object of the present invention is to provide a novel and useful tracking control system in a magnetic recording and/or reproducing apparatus in which the above described problems have been overcome.

Another and more specific object of the present invention is to provide a tracking control system in a magnetic recording and/or reproducing apparatus in which the frequency of the above tracking reference signal is selected as a frequency where the signal level of the tracking reference signal reproduced from the track which is recorded by a head having the same azimuth angle as that of the reproducing head is higher than the signal level of the tracking reference signal reproduced as cross-talk from the track which is recorded by a head having an azimuth angle different from that of the reproducing head, regardless of the state of the tracking error of the reproducing head. According to the tracking control system of the present invention, the tracking error can be accurately detected, the phenomenon in which the opposite track is reproduced is eliminated, and a stable and positive tracking control can be performed even with respect to a large tracking error. Thus, further to the simple correction of the tracking error, a reproduced main information signal of high quality can be obtained by a reproducing operation which is stable upon modes such as a high-speed, reverse, and slow-motion reproduction modes. Hence, especially when a long-duration recording and reproduction is performed by a slow tape speed in the narrow track width recently being used, the present system is suited in that the tracking control can be performed with high accuracy.

Other objects and further features of the present invention will be apparent from the following detailed description with respect to the preferred embodiments of the invention when read in conjunction with the accompanying drawings.

BRIEF DESCRIPTION OF THE DRAWINGS

FIG. 1 is a diagram showing track patterns on a magnetic tape;

FIGS. 3(A) through 3(C) are graphs respectively showing waveforms at each parts of the block diagram of FIG. 2;

FIG. 4 is a graph showing one example of the frequency spectrum of a recording signal;

FIGS. 7(A) through 7(N) are graphs respectively showing the waveforms of signals at each parts of the systematic block diagram of FIG. 7;

FIG. 8(A) is a diagram for describing the state of the tracking upon reproduction;

FIGS. 8(B) through 8(L) are graphs respectively showing the waveforms of signals at each parts of the essential part of the reproducing system in the systematic block diagram of FIG. 2;

FIG. 10 is a graph showing the relationship between the tracking error of the head and the cross-talk quantity, having the frequency of the reference signal as the parameter (only when the width of the head is larger than the track width)

DETAILED DESCRIPTION

For example, in the case where the distance X from the position where a video head mounted on the rotary drum begins to make contact with a magnetic tape 10, to the control head, as indicated in FIG. 1, is longer than a standard value in the recorder, the scanning path of the reproducing video head becomes as indicated by a dotted line 12 and deviates from the track indicated by a solid line 11. Control pulses are recorded by the control head along a track 13 at the lower edge of the tape, and, in the case of a long-duration recording, as described hereinbefore, the recorded interval of the control pulse is very small, 0.37 milli-meters, for example, which is approximately ⅓ of the conventional value. For this reason, the absence of tracking phase deviation is especially required.

Figure 2:
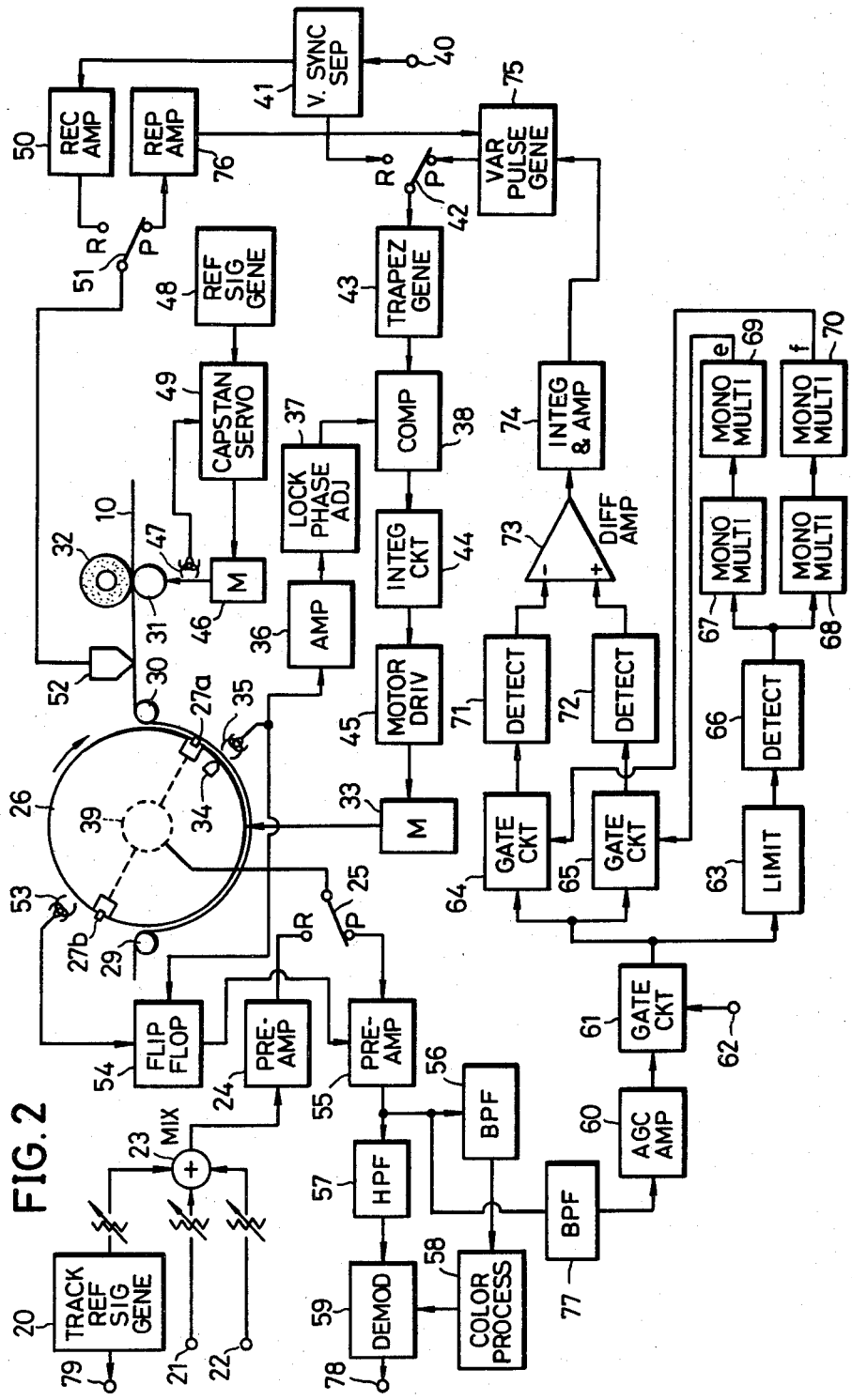
FIG. 2 is a systematic block diagram showing a first embodiment of a tracking control system of the present invention.

A first embodiment of the tracking control system according to the present invention will now be described in conjunction with FIG. 2. A tracking reference signal generator 20 generates a tracking reference signal of a single frequency at a constant duration every predetermined period as described hereinafter. Moreover, the essential point in the subject matter of the present invention lies in the selection of the frequency of this tracking reference signal, and this will be described hereinafter in detail. A luminance signal separated from a standard color television video signal of a system such as the NTSC system, for example, frequency-modulates a carrier wave such that the white peak corresponds to at 4.4 MHz and the tip of the synchronizing signal corresponds to 3.4 MHz. The frequency modulated (FM) luminance signal thus obtained, is supplied to an input terminal 21. A carrier chrominance signal having a color sub-carrier frequency of 3.58 MHz separated from the above standard color video signal, is frequency converted to a frequency band lower than that of the above frequency modulated luminance signal. The low-band frequency converted carrier chrominance signal of a chrominance sub-carrier frequency of approximately 629 KHz (a frequency which is 40 times the horizontal scanning frequency fh of the video signal) thus obtained, is applied to an input terminal 22. The above tracking reference signal produced as output from the tracking reference signal generator 20, is mixed in a mixer 23 together with the above described FM luminance signal applied through the input terminal 21, and the above described low-band frequency converted carrier chrominance signal applied through the input terminal 22.

Here, the above tracking reference signal is a single frequency signal of 476 KHz, for example, which is produced as output as indicated in FIG. 3(C) during a time interval corresponding to the interval in which the front porch and a horizontal synchronizing signal 80 exist in the color video signal indicated in FIG. 3(A), excluding the back porch period in which a color burst signal 81 within the horizontal blanking period (H.BLK) thereof exists. Furthermore, this tracking reference signal is produced from the tracking reference signal generator 20 every predetermined period (e.g., every interval 3H) so that the recorded position of the tracking reference signal in one of the recorded tracks will be different at the front and at the rear, respectively, in the longitudinal direction of the track relative to the recorded positions of the tracking reference signals on the two tracks which are adjacent to that one track. FIG. 3(B) indicates the waveforms of the carrier chrominance signal and the color burst signal, which are separated from the color video signal indicated in FIG. 3(A).

Thus, even when the frequency of the tracking reference signal is caused to co-exist in the frequency band of the low-band frequency converted carrier chrominance signal, the tracking reference signal is inserted within the interval comprising no signals (the interval designated by reference numeral 82 in FIG. 3(B)) of the low-band frequency converted carrier chrominance signal, and these signals are mutually time divisionally multiplexed, whereby these signals are respectively discriminated and separated by sampling gate means.

The tracking reference signal may be multiplexed and recorded over the entire horizontal blanking period (H.BLK) of the color video signal. Even in this case, the frequency of the tracking reference signal differs from the frequency of the chrominance sub-carrier wave of the low-band frequency converted carrier chrominance signal, that is, from the frequency of the color burst signal (for example, of approximately 629 KHz). Accordingly, the color burst signal and the tracking reference signal can be effectively separated by using the sampling gate means and frequency selection means together.

The frequency spectrum of the mixed signal produced as output from the mixer 23 becomes as indicated in FIG. 4, in which the FM luminance signal is indicated by the band I, the low-band frequency converted carrier chrominance signal by the band II, and the tracking reference signal by the band III. The above mixed signal is appropriately amplified by a preamplifier 24 and thereafter, passing through a chageover switch 25 which is connected on the side of its contact point R upon recording, and through a rotary transformer 39, is supplied respectively to two rotary magnetic heads 27a and 27b provided on a rotary drum 26 on diametrically opposite sides thereof.

As shown in FIG. 1, gaps 28a and 28b of the rotary magnetic heads 27a and 27b are inclined in opposite directions with a predetermined angle, that is, the rotary magnetic heads 27a and 27b have opposite azimuths. The magnetic tape 10, guided by a guide pole 29, is wrapped around the cylindrical surface of the rotary drum 26 over a specific angular range, and, further guided by a guide pole 30, and clamped between a capstan 31 and a pinch roller 32, thereby being driven in its travelling direction. The rotary magnetic heads 27a and 27b alternately form on the magnetic tape 10 in succession, each video track inclined relative to the longitudinal direction of the magnetic tape per each field without providing any guard bands.

The rotary drum 26 is rotated at a speed of, for example, 1,800 rpm, by a drum motor 33, and its rotational phase and speed are controlled at constant values by a drum servo-control system described below. The rotary drum 26 is provided with a magnet 34, which unitarily rotates with the rotary drum 26. Every time this magnet 34 passes in front of a pickup head 35, this pickup head 35 produces as output, a drum pulse, which is supplied by way of a pulse amplifier 36 and a lock phase adjusting circuit 37, to a comparator 38.

On the other hand, a standard color video signal to be recorded, which has been introduced through an input terminal 40, is fed to a vertical synchronizing signal separation circuit 41, wherein the vertical synchronizing singal is separated. This vertical synchronizing signal thus separated, is passed through a changeover switch 42 closed on the side of its contact point R upon recording, and is supplied to a trapezoidal wave generating circuit 43, wherein the signal thus supplied is converted into a trapezoidal wave of 30 Hz. Thereafter, this trapezoidal wave is supplied to the comparator 38 to undergo phase comparison with the above mentioned drum pulse. An error voltage in accordance with the phase difference is thus obtained from the comparator 38, and is passed through an integration circuit 44 for cutting a frequency component of ½ or more of the sampling frequency of 30 Hz, at the same time attenuating the hunting, and, moreover, taking an amply large gain of the very low frequency part thereby to reduce the constant deviation, in order to accomplish smooth control of the drum rotational phase. The resulting output of the integration circuit 44 is supplied to a motor driving circuit 45, wherein the signal thus supplied is converted into a required control voltage, and is applied to the drum motor 33 to control the rotational phase of the rotary drum 26.

The capstan 31 is rotated by a capstan motor 46. As is known, its rotation is picked up by a capstan pickup head 47, the output of which is fed to a capstan servo circuit 49, where its phase is compared with that of a standard signal from a standard signal generator 48. As a result, the capstan servo circuit 49 produces as output a signal for causing the capstan motor 46 to rotate continuously with predetermined constant phase and speed, and this output signal is applied to the capstan motor 46. Upon recording, the vertical synchronizing signal from the vertical synchronizing signal separation circuit 41 is amplified by a recording amplifier 50 and is then passed through a changeover switch 51 closed on the side of its contact point R, and thus supplied to a control head 52 to be recorded as control pulses, along an edge part of the magnetic tape 10 in the longitudinal direction thereof.

Figure 5:
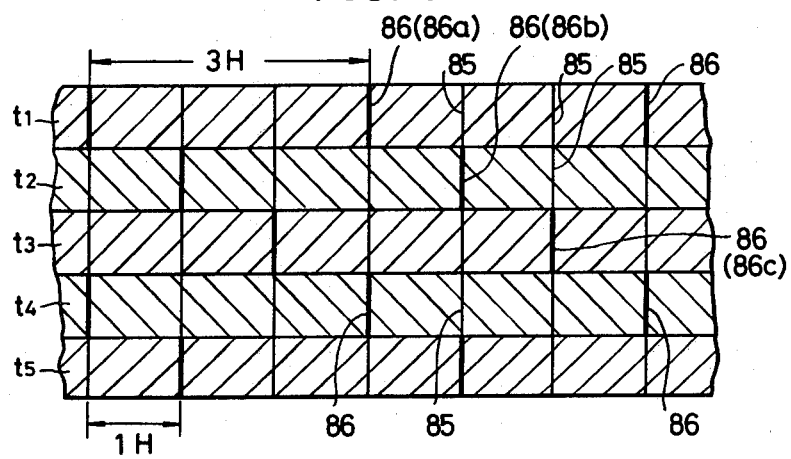
FIG. 5 is a diagram showing one example of the track pattern on the magnetic tape formed by a magnetic recording and/or reproducing apparatus applied with a system of the present invention.

One example of a track pattern formed in this manner on the magnetic tape 10 becomes as shown in FIG. 5, which is a partly enlarged view. In FIG. 5, tracks $t_1$, $t_2$, $t_3$, $t_4$, and $t_5$—are respectively formed with inclination relative to the longitudinal direction of the tape. Tracks $t_1$, $t_3$, $t_5$—are recorded and formed, for example, by the aforementioned rotating magnetic head 27a, while tracks $t_2$, $t_4$, $t_6$,—are recorded and formed by the aforementioned rotating magnetic head 27b. The horizontal synchronizing signals are recorded at positions indicated by thin lines 85 on the respective tracks. The positions of the lines 85 are aligned to lines on the adjacent tracks in directions perpendicular to the longitudinal direction of the tracks. The tracking reference signals are recorded at positions indicated by thick lines 86. The interval of the positions of the lines 86 is 3H (H indicates a horizontal scanning period). The positions of the lines 86 are staggered on respective adjacent tracks. For example, tracking reference signal recording positions 86a, 86b and 86c on the tracks $t_1$, $t_2$, and $t_3$, are sequentially staggered by an interval 1H.

Figure 6:
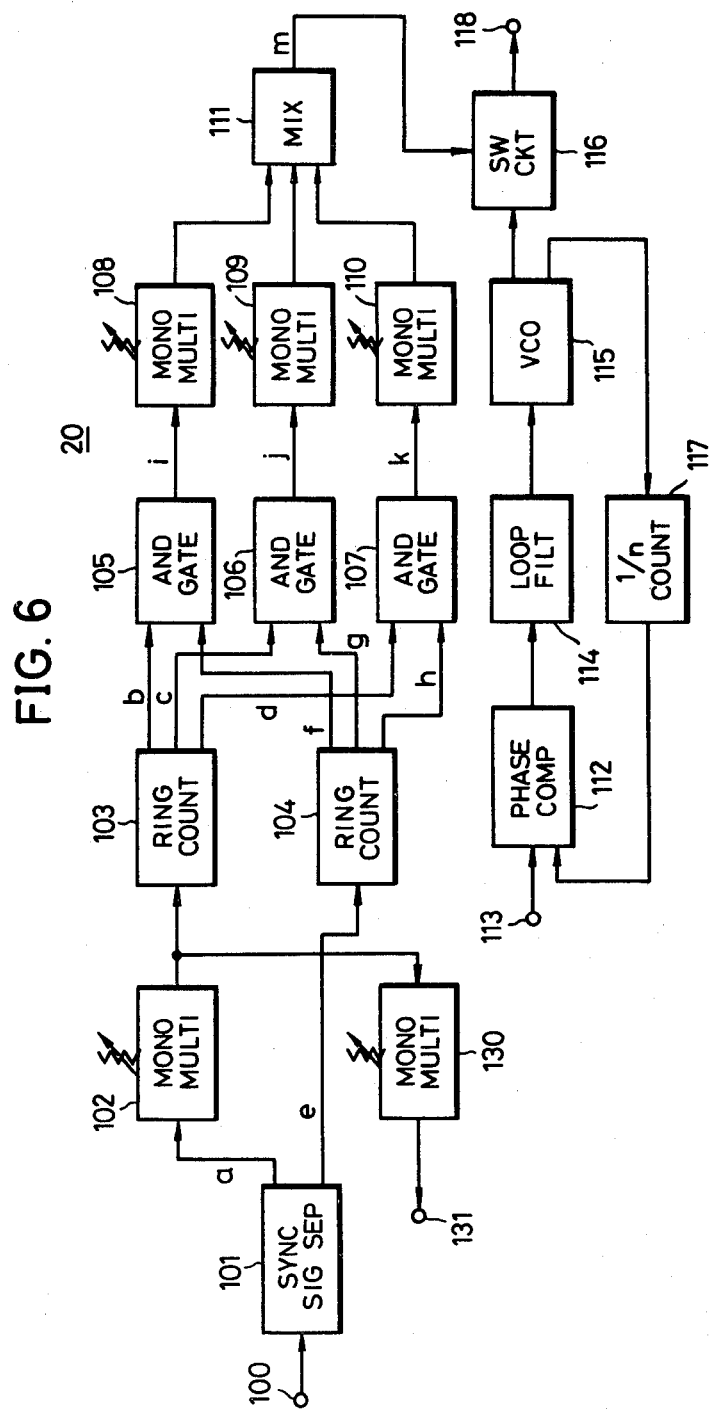
FIG. 6 is a detailed systematic block diagram showing one embodiment of essential parts of the block diagram of FIG. 2.

An embodiment of the tracking reference signal generator shown in FIG. 2 will now be described in detail with reference to FIG. 6. In FIG. 6, a recording standard color television video signal applied to an input terminal 100 is supplied to a synchronizing signal separation circuit 101 where the vertical synchronizing signal and the horizontal synchronizing signal are separated from the video signal. The horizontal synchronizing signal a shown in FIG. 7(A) which is derived from the synchronizing signal separation circuit 101, is supplied to a monostable multivibrator 102 which generates a pulse which coincides with the rising of the horizontal synchronizing signal a, and is delayed by approximately 1H. This pulse is supplied to a ring counter 103 which generates pulses b, c, and d shown in FIGS. 7(B), 7(C), and 7(D) which respectively have a pulse width of 1H and an interval of 3H. The pulses b, c, and d are sequentially obtained with a time difference of 1H with each other.

The vertical synchronizing signal e shown in FIG. 7(E) which is derived from the synchronizing separation circuit 101, is supplied to a ring counter 104 which generates pulses f, g, and h respectively having a pulse width of 1V (V designates a vertical scanning period) and a time interval of 3V as shown in FIGS. 7(F), 7(G), and 7(H). The pulses f, g, and h are sequentially derived with a time difference of 1H with each other. Shift registers may be used instead of the ring counters 103 and 104. The pulses b and f are supplied to an AND gate 105. The pulses c and g are supplied to an AND gate 106. The pulses d and h are supplied to an AND gate 107. As a result, pulses i, j, and k shown in FIGS. 7(I), 7(J), and 7(K) are respectively derived from the AND gates 105, 106, and 107. The pulses i, j, and k respectively have a pulse width of 1H and are derived during a period of 1V. This deriving period of 1V has a time interval of 3V. Further, as clearly shown in FIGS. 7(I), 7(J), and 7(K), during a certain 1V-period, only the pulses i are derived, while the pulses j and k are not derived. During a next 1V-period, only the pulses j are derived. And during a further next 1V-period, only the pulses k are derived. When observed time sequentially, the pulses i, j, and k show a series of pulses each of which has a pulse width of 1H and a time interval of 3H.

The above pulses i, j, and k are respectively applied to monostable multivibrators 108, 109, and 110, wherein the pulses are transformed into pulses having a pulse width of high level, for the predetermined period 82 shown in FIG. 3(C) from the rise of the pulses. The pulses obtained from the monostable multivibrators 108, 109, and 110 are respectively supplied to a mixer 11 wherein the pulses are mixed, and a pulse m having a period 3H and a pulse width which is equal to the period 82 corresponding to the period excluding the back porch within the horizontal blanking period as shown in FIG. 7(M), is obtained. This pulse m thus obtained is applied to a switching circuit 116 as a switching pulse.

On the other hand, an oscillating output (sinusoidal wave) of high frequency stability of about 3.58 MHz is obtained from an oscillator 112, and this oscillating output is frequency divided to one-fourth its frequency, to about 895 KHz, by a frequency divider 113.

On the other hand, the output drum pulse of a flip-flop 54 is supplied to a phase comparator 112 from a terminal 113, and compared with a signal of approximately 30 Hz supplied from a 1/n counting-down circuit 117. The output of the phase comparator 112 is supplied to a voltage controlled oscillator (VCO) 115 through a loop filter 114. In the present embodiment of the invention, the oscillating center frequency of the VCO 115 is selected at 476 KHz. The oscillating output of the VCO 115 is supplied to the 1/n counting-down circuit 117 and also to the switching circuit 116. In the present embodiment of the invention, the value of n in the 1/n counting-down circuit 117 is selected at 15883. The output of the VCO 115 having a frequency of 476 KHz passes through the switching circuit 116 only during the period in which a switching pulse from the mixer 111 is applied, and is then obtained from an output terminal 118.

Moreover, as will be described later on, in another embodiment of the invention in which the frequency of the tracking reference signal is selected at 1.4296 MHz, for example, the oscillating center frequency of the VCO 115 is selected at 1.4296 MHz, and the value of n in the 1/n counting-down circuit 117 is selected at 47,701.

Accordingly, in the present embodiment of the invention, a sinusoidal wave n of about 476 KHz is obtained every period of 3H from the output terminal 118, for the period 82 which corresponds to the period excluding the back porch within the horizontal blanking period of the standard color video signal which is to be recorded, as shown in FIG. 7(N) or FIG. 3(C). This signal thus obtained is supplied to the mixer 23 as a tracking reference signal from the output terminal 118 as shown in FIG. 2. The tracking reference signal of single frequency (about 476 KHz in this case) thus generated, is recorded at the position 86 shown by the line of FIG. 5 by the rotary magnetic heads 27a and 27b, as described above.

Referring back to the block diagram of FIG. 2, the operation of the system of the present invention upon reproduction will now be described. During reproduction, the changeover switches 25, 42, and 51 are respectively connected to the side of the contact point P. The signal alternately reproduced by the rotary magnetic heads 27a and 27b from the magnetic tape 10 which is moving at a speed identical to that upon recording, is supplied to a preamplifier 55 through the rotary transformer 39 and the changeover switch 25, respectively. The connection at the preamplifier 55 is changed over and connected according to the output signal supplied from the flip-flop 54, and the signal supplied to the preamplifier as described above is transformed into a continuous signal. The flip-flop 54 is triggered by the pulses supplied from the pickup head 35 and a pickup head 53 (these pickup heads are provided mutually opposing each other), each of which produces a pulse as output every time the magnet 34 passes in front of it. As a result, the flip-flop 54 generates a symmetrical rectangular wave of 30 Hz.

The reproduced signal obtained from the preamplifier 55 is a composite signal comprising an FM luminance signal, a low-band frequency transformed carrier chrominance signal, and a tracking reference signal which co-exists within the frequency band of the low-band frequency converted carrier chrominance signal, and this signal is respectively supplied to a band-pass filters 56 and 77 and a high-pass filter 57. The above low-band frequency transformed carrier chrominance signal separated at the band-pass filter 56 by the above reproduced composite signal, is supplied to a color processing circuit 58. The reproduced low-band frequency converted carrier chrominance signal thus supplied to the band-pass filter 56 is converted back into a carrier chrominance signal of the original frequency band, having a chrominance sub-carrier frequency of 3.58 MHz, and at the same time, supplied to a demodulating circuit 59 after being eliminated of its time-axis fluctuation component. The demodulating circuit 59 frequency demodulates the reproduced FM luminance signal separated from the above reproduced composite signal by the high-pass filter 57, to a luminance signal in the original frequency band, and also obtains a reproduced color video signal by multiplexing the demodulated luminance signal with the reproduced carrier chrominance signal from the color processing circuit 58. This reproduced color video signal is obtained from an output terminal 78.

On the other hand, the reproduced tracking reference signal within the above reproduced composite signal obtained from the band-pass filter 77, is supplied to a gate circuit 61 through an AGC amplifier 60. The signal thus applied to the gate circuit 61 is gated by the gating pulse supplied from a terminal 62. The gating pulse applied to the terminal 62 is supplied through an output terminal 131 from a multivibrator 130 which is triggered by a pulse in synchronism with the horizontal synchronizing signal obtained from the multivibrator 102 of the tracking reference signal generator 20 shown in FIG. 6. This gating pulse is a pulse of the form shown in FIG. 8(C), which is of high level during the period which corresponds to the period excluding the back porch within the horizontal blanking period of the horizontal synchronizing signal within the reproduced chrominance signal, and sets the gate circuit 61 in a signal passing state during the period in which the pulse is of high level.

Accordingly, a reproduced tracking reference signal existing within the frequency band of the reproduced low-band frequency converted carrier chrominance signal, is separated and obtained from the reproduced low-band frequency converted carrier chrominance signal of the gate circuit 61. This reproduced tracking reference signal (including the tracking reference signal reproduced as cross-talk from the adjacent tracks when tracking error exists) is respectively supplied to a limiter 63, and gate circuits 64 and 65. The AGC amplifier 60 and the limiter 63 can be omitted. The reproduced tracking reference signal obtained from the limiter 63 is supplied to a detection circuit 66, wherein the reproduced tracking reference signal having a level higher than that of a predetermined level is detected. That is, the detection circuit 66 detects only the tracking reference signal reproduced from the track which is scanned by the rotary magnetic heads 27a and 27b. This detected output is applied respectively to multivibrators 67 and 68, and triggers these two multivibrators. These multivibrators 67 and 68 are used for position adjustment, and are triggered at the leading edge of the output of the wave detection circuit 66. Accordingly, these multivibrators 67 and 68 supply as output a pulse of a predetermined pulse width, and triggers width adjusting multivibrators 69 and 70 at the trailing edge of the above output pulse. Therefore, a gating pulse which becomes of high level during the period which corresponds to the period excluding the back porch within the horizontal blanking period of the horizontal synchronizing signal, that is, approximately a period of 2H later than the tracking reference signal reproduced from the scanned track as shown in FIG. 8(E), is supplied to the gate circuit 64 from the multivibrator 69. On the other hand, a gating pulse f which becomes of high level during the period which corresponds to the period excluding the back porch within the horizontal blanking period of the horizontal synchronizing signal, that is, approximately a period of 1H later than the tracking reference signal reproduced from the scanned track as shown in FIG. 8(F), is supplied to the gate circuit 65 from the multivibrator 70.

When the rotary magnetic heads 27a and 27b are accurately scanning the track which is recorded by a magnetic head having the same azimuth angle as those of the magnetic heads 27a and 27b (when the rotary magnetic head 27a is accurately scanning a track t3 as shown by 27a1 of FIG. 8(A)), no signal is supplied as output from the gate circuits 64 and 65.

Hence, in a mistracking state in which reproduction and scanning is performed extending over tracks t2 and t3 as shown by 27a2 of FIG. 8(A) upon scanning of the track t3 by the rotary magnetic head 27a, the input signal waveform of the gate circuit 61 becomes of a signal waveform shown in FIG. 8(B), which comprises the reproduced low-band frequency converted carrier chrominance signal, color burst signal, a reproduced tracking reference signal 120 obtained from the track t3, and a tracking signal 121 which is of low level obtained from the track t2 as cross-talk a period of 2H later than that of the reproduced tracking reference signal 120. Here, in the above known azimuth recording system, the track t2 (or t4) adjacent to the track t3 is a track recorded by the rotary magnetic head 27b having an azimuth angle different from that of the rotary magnetic head 27a. Therefore, the signal of high frequency in the adjacent track t2 is hardly reproduced due to the so-called azimuth loss, however, the recorded tracking reference signal of low frequency is reproduced in a somewhat degraded state.

Accordingly, the output signal waveform of the gate circuits 61 becomes of a form shown in FIG. 8(D), and the output signal waveforms of the gate circuits 64 and 65 constructed so that they provide the input signal as gate outputs, become of the form shown in FIGS. 8(G) and 8(H) during the period in which the gating pulses e and f are of positive polarity. Moreover, the tracking reference signal 121 reproduced as cross-talk from the adjacent track t2 only by the gate circuit 64, is supplied to a differential amplifier 73 through a detection circuit 71.

On the other hand, in a mistracking state in which the rotary magnetic head 27a reproduces and scans extending over the tracks t3 and t4 as shown by 27a3 of FIG. 8(A), the reproduced tracking reference signal 120 from the track t3 and a tracking reference signal 122 having a low level which is reproduced from the track t4 as cross-talk a period of 1H after the reproduced tracking reference signal 120, which are respectively mixed in a time-series manner to the reproduced low-band frequency transformed carrier chrominance signal and the color burst signal, are applied to the gate circuit 61 as shown in FIG. 8(I).

Hence, the output signal waveform of the gate circuit 61 becomes of a form shown in FIG. 8(J), and the output signal waveforms of the gate circuits 64 and 65 accordingly becomes of the form shown in FIGS. 8(K) and 8(L). The tracking reference signal 122 reproduced as cross-talk from the track t4 is shown in FIG. 8(L), which is obtained only from the gate circuit 65, is supplied to a differential amplifier 73 through a detection circuit 72.

Thus, during normal tracking state, no output is supplied from either the gate circuit 64 or 65, and according to whether the direction of shift upon mistracking is in the leading direction of the phase or the lagging direction of the phase, the gate output is constantly obtained with a predetermined relationship from either the gate circuit 64 or 65. Accordingly, the mistracking direction can be discriminated by detecting which of the gate circuit 64 or 65 supplies the gate output. Furthermore, the level of this gate output signal corresponds to the tracking error quantity, and by converting the output signal of the gate circuit 64 or 65 into a DC signal by the use of a detection circuit 71 and the detection circuit 72, the deviation quantity in the mistracking can be detected.

The tracking error signal obtained from the differential amplifier 73 differs in polarity according to the mistracking direction, and is a signal having a level corresponding to the above shift quantity. This error signal is supplied to an integrating and amplifying circuit 74, and supplied to a variable pulse generating circuit 75 to vary its time constant value, after being averaged and amplified therein. This time constant is related to the response characteristic of the tracking servo loop having a closed loop construction, and a desirable result is obtained when the value is approximately 3 to 20 seconds.

The output pulse of the variable pulse generation circuit 75 is applied to the trapezoidal wave generator 43 through the changeover switch 42 which is connected to the side of the contact P, and the output pulse thus applied to this trapezoidal wave generator 43 is frequency divided to one-half its frequency and converted into a trapezoidal wave. The output trapezoidal wave undergoes phase comparison with the drum pulse supplied from the lock phase adjusting circuit 37, at the comparator 38. From then on, the rotational phase of the drum motor 33, that is, the rotational phase of the rotary magnetic heads 27a and 27b are controlled by the same drum servo-control system used upon recording, and accurate tracking control is obtained in which the rotary magnetic heads 27a and 27b accurately scan on the video track.

The level of the reference signal reproduced from the track which is to be scanned, must always be higher than that of the reproduced reference signal reproduced as cross-talk from the adjacent track. However, as stated above, at some frequencies of the tracking reference signal, the tracking reference signal of the adjacent track which should be reproduced as cross-talk is sometimes not reproduced although the tracking error exists, and furthermore, according to the tracking error, the signal level of the reference signal of the adjacent track reproduced as cross-talk sometimes becomes higher than the signal level of the reference signal reproduced from the track which is to be scanned.

As one example, the cross-talk quantity C obtained when the reproducing head performs reproduction extending over a track recorded by a head having an azimuth angle different from that of the reproducing head, can be described by the following equation (1). In equation (1), the tracking error quantity, the track width, the cross-talk frequency, the relative speed between the tape and the head, and the azimuth angle are respectively designated by the symbols t, T, f, V, and α.

$$C = 100 \frac{t}{T} \left| \frac{\sin\left(\frac{2\pi ft}{V} \tan\alpha\right)}{\frac{2\pi ft}{V} \tan\alpha} \right| \% \quad (1)$$

Figure 9:
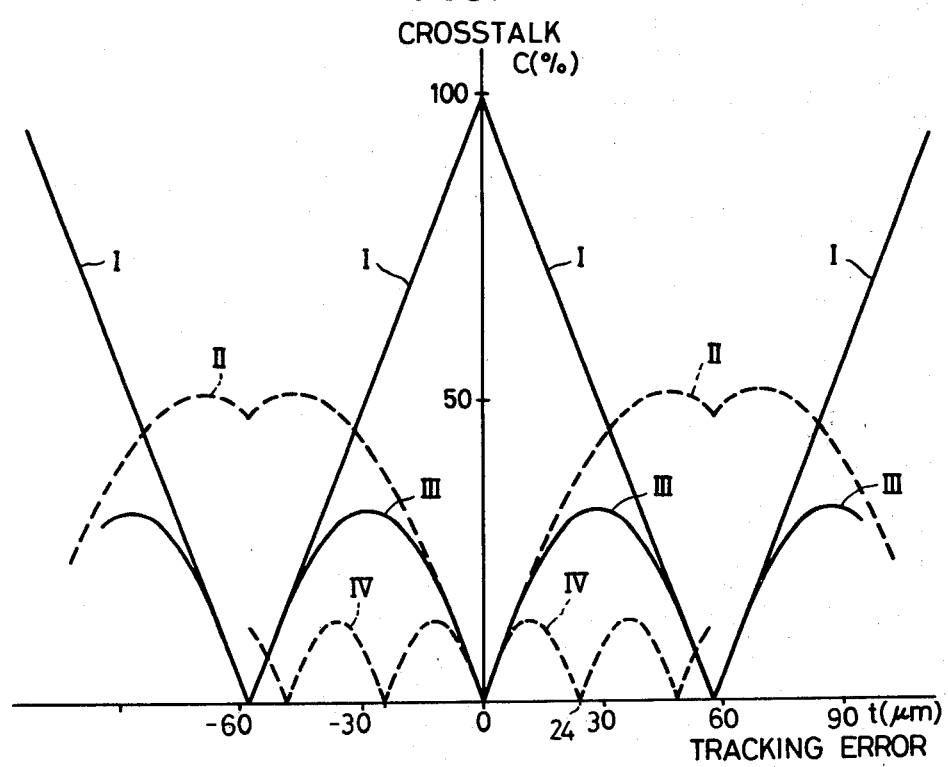
FIG. 9 is a graph showing the relationship between the tracking error of the head and the cross-talk quantity, having the frequency of the reference signal as the parameter (only when the track width is equal to the width of the head)

Accordingly, when the track width T, the azimuth angle α, and the relative speed V between the tape and the head respectively are 58 micron-meters, ±6 degrees, and 5.8 meters per second for a two-hour recording, the cross-talk quantity C with respect to the tracking error becomes as shown in FIG. 9. In FIG. 9, the line I shows the reproduced signal level obtained from a track (normal track) recorded with a head having the same azimuth angle as that of the reproducing head. On the other hand, the curves II, III, and IV respectively show the corss-talk quantity obtained from a track (reverse track) recorded with a head having an azimuth angle different from that of the reproducing head. These curves II, III, and IV respectively show the cross-talk quantity when the recorded signal frequencies respectively are 298 kHz, 476 kHz, and 1.13 MHz.

As clearly seen in FIG. 9, the cross-talk quantity C of the head with respect to a tracking error which is the distance between the center line of the track width and the center line of the recording track along the longitudinal direction thereof, differ according to the recorded signal frequency of the reverse track. When the recorded signal frequency is 476 kHz as shown by the curve III, the cross-talk quantity increases substantially proportional to the tracking error up to a point where the tracking error is about 24 micron-meters. In addition, when the tracking error increases further, the cross-talk quantity decreases, and never becomes higher than the reproduced signal level from the normal track.

In a case where the recorded signal frequency is 298 kHz which is lower than the above case, the cross-talk quantity increases as the tracking error increases as shown by the curve II of FIG. 9, and becomes higher than the reproduced signal level of the normal track when the tracking error is over 30 micron-meters. On the other hand, when the recorded signal level is 1.13 MHz which is a relatively high frequency, the increasing range of the cross-talk quantity is narrow as shown by the curve IV of FIG. 9. In this case, the cross-talk quantity is zero when the tracking error is about 24 micron-meters although the tracking error exists, and hence, this case cannot be discriminated from the case where no tracking error exists. Further, the cross-talk quantity becomes higher than the reproduced signal level of the normal track when the tracking error is about 54 micron-meters.

Therefore, in order for the level of the reproduced reference signal from the normal track to be higher than that of the reproduced reference signal from the reverse track, the frequency of the reference signal must be selected so that the cross-talk quantity C becomes zero when the tracking error is exactly one track pitch. This frequency is 476 kHz in the above example. Hence, the above condition can be obtained by a general equation. The cross-talk quantity C can be described by the following equation (2) when the above equation (1) is expanded, where $\alpha$ and $\beta$ respectively indicate the respective azimuth angles of the two rotary magnetic heads 27a and 27b.

$$C = 100 \frac{t}{T} \frac{\left| \sin\left\{ \frac{\pi ft}{V}(\tan\alpha + \tan\beta) \right\} \right|}{\frac{\pi ft}{V}(\tan\alpha + \tan\beta)} \quad (2)$$

Here, the angle $\alpha$ designates an azimuth angle sloping in the positive direction with respect to the direction of the track width, and the angle $\beta$ designates an azimuth angle sloping in the negative direction with respect to the direction of the track width. Moreover, the above equation (1) describes a special case where $\alpha = \beta$ in the equation (2). Next, to obtain a condition where the cross-talk quantity C becomes zero when the tracking error is one track pitch, the numerator in the equation (2) need to be zero. Accordingly, $$\sin\left\{ \frac{\pi ft}{V}(\tan\alpha + \tan\beta) \right\} = 0 \text{ and}$$

$$\frac{\pi ft}{V}(\tan\alpha + \tan\beta) = n\pi \quad (n \text{ is an integer})$$

By simplifying the above equation, $$f = \frac{nV}{t(\tan\alpha + \tan\beta)} \quad (3)$$

However, since t=T, $$f = \frac{nV}{T(\tan\alpha + \tan\beta)} \quad (4)$$

The frequency obtained when n=1, is that of the recorded signal frequency shown by the curve III in FIG. 9, and when n=n, the extreme value of the cross-talk quantity appears n times between where the tracking error is zero and T. Accordingly, the most suitable frequency f of the reference signal can be described by the following equation (5).

$$f = \frac{V}{T(\tan\alpha + \tan\beta)} \quad (5)$$

Further, when mutually adjacent tracks are formed with mutually different azimuth angles $\alpha(\alpha=\alpha)$ and $-\alpha(\beta=\alpha)$, the reference signal frequency can be described by the following equation (6)

$$f = \frac{V}{2T\tan\alpha} \quad (6)$$

Another embodiment of the invention will now be described. The cross-talk quantity of the reverse track when the track widths are all the same but the width of the head is wider than the track width, becomes different from that in the above described case. When the track width, the width of the head, the azimuth angle of the head, and the relative speed V between the tape and the head are 19.3 micron-meters, 29.3 micron-meters, +6 degrees, and 5.8 meters per second respctively for a six-hour recording, the cross-talk quantity becomes as shown in FIG. 10. In FIG. 10, the curve I shows the level of the signal reproduced from the normal track, which does not become zero even when the tracking error becomes equal to the track width of 19.3 micron-meters, and is of a certain output level.

On the other hand, the curves II, III, and IV respectively show the cross-talk quantity from the reverse track when the respective frequencies are 895 kHz, 1.2 MHz, and 1.4296 MHz. The cross-talk quantity obtained when a signal of 895 kHz is recorded in the reverse track, is minimum when the tracking error is zero as shown by the curve II in FIG. 10, and the cross-talk quantity increases when the tracking error increases. When the tracking error becomes equal to or close to the track width of 19.3 micron-meters, the cross-talk quantity becomes higher than the level of the reproduced signal from the noraml track. Accordingly, this frequency is unsuitable as the reference signal frequency.

Furthermore, the cross-talk quantity obtained when a signal of 1.2 MHz is recorded in the reverse track, becomes as shown by the curve III in FIG. 10. In addition, the cross-talk quantity obtained when a signal of 1.4296 MHz is recorded in the reverse track, becomes as shown by the curve IV in FIG. 10. In either case, the cross-talk quantity is always lower than the level of the reproduced signal of the normal track, and hence, these frequencies are suitable as the reference signal frequency.

In the system according to the present invention, the adjacent tracks on the magnetic recording medium (not limited to magnetic tapes) are recorded and formed by heads (not limited to two heads) having mutually different azimuth angles. Further, a reference signal is intermittently multiplexed to the main information signal and recorded in the above tracks, where the main information signal is a signal desirably obtained as the final information. Upon reproduction, the above reference signal recorded in the recording medium is reproduced, and the reference signal having the highest level, is designated as the reproduced reference signal from the normal the normal track. The level comparison is performed with reference to the above reproduced reference signal, by extracting the reference signal reproduced as cross-talk. Hence, regardless of the state of the tracking error, the frequency of the reference signal need only be a frequency to always maintain the level of the reproduced reference signal reproduced from the normal track higher than that of the reproduced reference signal reproduced as corss-talk.

Moreover, the point is to enable reproduction of the reference signal as corss-talk from the adjacent track, and thus, the track pattern is not limited to the track pattern in which no guard band is provided as shown in FIG. 1, and a track pattern having a certain guard band to allow reproduction as cross-talk, can be used.

Figure 11:
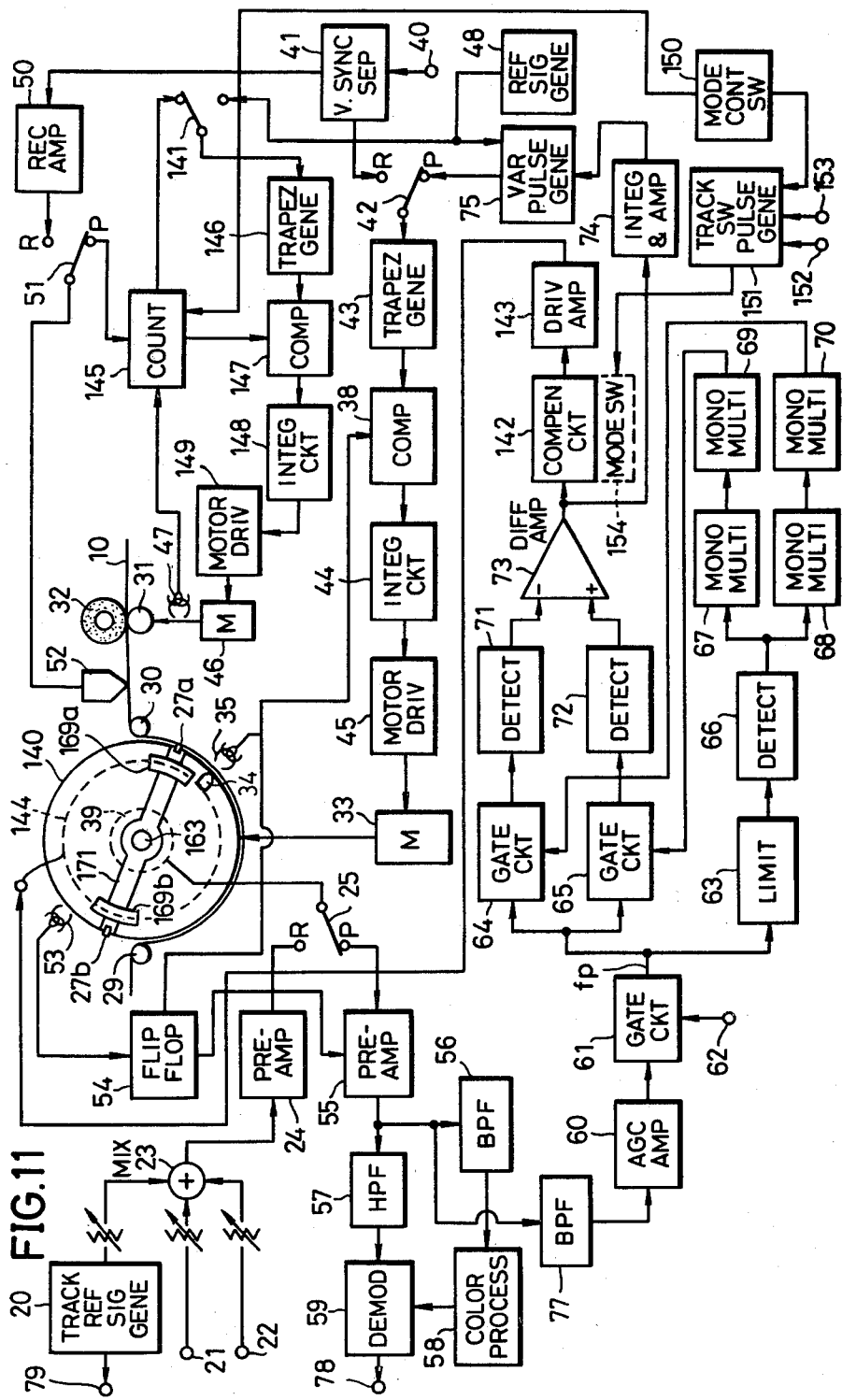
FIG. 11 is a systematic block diagram showing a second embodiment of a tracking control system of the present invention.

A second embodiment of a system according to the present invention will now be described in conjunction with FIG. 11. In FIG. 11, those parts which are the same as those corresponding parts in FIG. 2 are designated by the like reference numerals, and their description will be omitted. In the present embodiment, tracking control of the rotating head is performed for each of the track in the recorded video track, by adding a head moving mechanism to the above first embodiment. Accordingly, fine tracking control can be performed to compensate for skews of the recorded video track, error due to the up-and-down movement of the magnetic tape, the degree of inclination in the video track, and the like, by the tracking servo loop having closed-loop construction. Furthermore, upon reproduction modes in which reproduction is performed under different tape travelling speed as compared to that upon recording, such as during slow-motion reproduction, fast-motion reproduction, and the like, accurate tracking control is performed over the video track and the noise bar is eliminated.

In FIG. 11, a rotary drum 140 comprises a head moving mechanism which displaces and drives the rotary magnetic heads 27a and 27b in a perpendicular direction relative to the track scanning direction. A known head moving mechanism such as the bending type bimorph can be used as the above head moving mechanism, but here, a case where a head moving mechanism which performs a so-called see-saw operation is employed, will be described. Moreover, detailed descriptions are given with respect to this head moving mechanism in the U.S. patent application Ser. No. 178,852 filed Aug. 1, 1980 entitled "Magnetic Recording and Reproducing Apparatus with Device for Tracking Control of Rotary Magnetic Heads".

Upon recording, the changeover switches 25, 42 and 51, and a switch 141 are connected on the side of the contact point R. Accordingly, by the same operation as that in the above first embodiment, a track pattern shown in FIG. 5 is formed on the magnetic tape 10.

On the other hand, upon reproduction, the changeover switches 25, 42, 51, and 141 are respectively connected on the side of contact point P. In a normal reproduction mode in which reproduction is performed under the same tape travelling speeed as that upon recording, the tracking error signal obtained from the differential amplifier 73 is applied to the variable pulse generation circuit 75 after being obtained of its average error signal component at each plurality of tracks by the integrating and amplifying circuit 74. This signal component is also supplied to a compensation circuit 142 comprising a known ratio compensation circuit, differentiation compensation circuit, and the like, and a predetermined characteristic compensation is performed in this compensation circuit 142. The output pulse of the variable pulse generation circuit 75 is supplied to the trapezoidal wave generation circuit 43 through changeover switch 42, as described in the above first embodiment.

The instantaneous value component (AC error signal component) at each track is obtained from the above tracking error signal by the compensation circuit 142. The signal thus obtained is applied to a driving coil 144 of the head moving mechanism after being converted into a desired driving voltage by a driving amplifier 143. Thus, the rotary magnetic heads 27a and 27b are controlled so that they scan a predetermined track, by displacing the rotary magnetic heads 27a and 27b by small amounts instant by instant in a perpendicular direction to the track longitudinal direction.

A swinging member 171 made of a ferromagnetic material is provided unitarily rotatable with a rotary shaft 163, and also allowed to freely swing even upon rotation of the swinging member 171. The rotary magnetic heads 27a and 27b are respectively fixed to arcuate yokes 169a and 169b formed on both sides of the swinging member 171. The yokes 169a and 169b respectively have reverse U-shaped cross sections, and permanent magnets are respectively provided at the inner parts of these yokes 169a and 169b.

The swinging member 171 rotates having a direction of inclination and an amount of inclination according to the size and polarity of the driving current, due to the magnetic force which is generated by the interaction between the driving current passed through the driving coil 144 which is wound around a cylindrical coil winding core inserted in the space in the U-shaped cross-sectional area of the yokes 169a and 169b, and the magnetic field due to the permanent magnets fixed to the yokes 169a and 169b. This see-saw rotation of the swinging member 171 is also performed when the swinging member 171 is unitarily rotating with the rotary drum 140.

By this rotational displacement of the swinging member 171, in which the swinging member 171 unitarily rotates with the rotary drum 140, and rotationally displaced on a plane which is perpendicular to the rotating plane of the rotary drum 140 by the tracking control voltage supplied from the above driving amplifier 143, the rotary magnetic heads 27a and 27b are rotationally displaced in directions perpendicular to the track longitudinal direction, respectively and simultaneously in mutually opposite directions. Hence, the magnetic heads accurately and constantly trace and scan on the track which is formed by a rotary magnetic head having the same magnetic direction as their own.

In order for the above continuous tracking control to be performed constantly and properly, it is necessary to maintain the mechanical displacement standard value within a predetermined range. In the case wherein the displacement quantity to be controlled exceeds the aboe predetermined range, the rotary magnetic head cannot accurately scan on the track. Accordingly, in the present embodiment, regarding the average error signal component having a long time constant (in the order of seconds) of the tracking error signal, the output signal of the variable pulse generation circuit 75 is fed back to the drum servo circuit as in the above first embodiment, to control the rotational phase of the rotary drum 140.

Moreover, the signal of the phase relative to the rotation of the capstan 31 detected by the capstan pickup head 47, is counted at a counter 145, and this output counted value is applied to a comparator 147. The signal thus applied to the comparator 147 undergoes phase comparison therein with the trapezoidal wave generated by trapezoidal wave generator 146. This trapezoidal wave is synchronized with the control pulse which is reproduced by the control head 52.

Hence, the phase error voltage obtained from the comparator 147 is fed back and applied to the capstan motor 46 through an integrating circuit 148 and a motor driving circuit 149, to control the rotational phase of the capstan motor 46.

The manner in which the frequency of the reference signal is selected in the present embodiment of the invention, is similar to that performed in the above first embodiment of the invention.

The above described operation if for normal reproduction mode, however, according to the present embodiment of the invention, the system is applicable during a so-called variable speed reproduction mode in which the tape travelling speed is set at a different speed from that recording, and reproduction of the video track is performed by setting the rotational speed of the rotary drum 140 to the same speed as that upon recording. During the above operation, the pulse used for varying the frequency dividing ratio of the counter 145 according to the special changed speed play mode, can be applied to the pulse counter 145 by use of a special changed speed play mode control switch 150, and constructed to apply a desired pulse to a tracking switching generator 151 upon necessity. The tracking switching pulse is produced from the pulse supplied from a terminal 152 having a period of 1H (pulse rate of H), and the reproduction control pulse supplied from a terminal 153. In the present embodiment of the invention, the track pattern of the magnetic tape 10 being reproduced is a pattern in which the tracking reference signal is of a single frequency having a long wavelength, and recorded in a position different throughout from that recorded in a certain track or the tracking reference signal recorded position on both sides of the tracks which is adjacent to the above certain track, respectively. Therefore, a switching pulse which is used for changing over the tracking polarity is not required. However, when the need arises, the switching pulse supplied from the tracking switching pulse generator 151 can be applied to a mode switch 154 as an open-loop control signal, to multiplex the switching pulse to the tracking error signal.

As described above, according to the present embodiment of the invention, the tracking error which is to be subjected to tracking compensation every time the track is scanned, is compensated by the compensation performed in the closed-loop in which the AC component of the tracking error signal is fed back to the head moving mechanism. Furthermore, by feeding back and applying the average value component of the tracking error signal every plurality of tracks to the rotary drum servo system at the same time, a superb tracking serv-control operation is performed having a large control range. Especially upon the so-called variable speed reproduction, the control operation performed by the head moving mechanism, is performed within the mechanically controllable range, and displacement control is performed in which displacement in the direction perpendicular to the track longitudinal direction of the rotary magnetic head by maintaining a predetermined mechanical displacement mean value. Accordingly, a variety of specially reproduced picture can be produced accompanying no noise bar.

In each of the above embodiment of the invention, a tracking reference signal is recorded at a predetermined period portion within the horizontal blanking period every period of 3H, and the reproduced phase is discriminated by reproducing the signal thus recorded, in a magnetic recording and/or reproducing apparatus in which, as shown in FIG. 5, recording is performed by arranging the horizontal synchronizing signal recording position in a direction perpendicular to the track longitudinal direction, in a so-called H-arrangement. However, this invention is not limited to the above described track pattern. The main point is that the magnetic tape should have a track pattern in which the tracking reference signal is recorded at a position in front relative to one track existing in the track longitudinal direction with respect to each of the tracking reference signal recorded position of the two adjacent tracks on both sides of a track, and at the rear relative to another track.

Moreover, the signal which is recorded and reproduced was explained as being a color video signal, however, the signal can of course be a black-and-white video signal, or a signal which is similar to that of a video signal, formed by letting a digital signal obtained by pulse code modulating (PCM) an audio signal and the like exist together with a composite synchronizing signal of a video signal.

Furthermore, the track pattern of the magnetic tape which can be subjected to recording and/or reproduction, is not limited to those in which no guard band exists. As described above, the frequency of the tracking reference signal is selected at a low-frequency band (476 kHz, for example), and can be easily picked up as cross-talk from the adjacent tracks even on a rotary magnetic head having a different azimuth angle. Accordingly, the tracking error signal can be produced even on a magnetic tape having a track pattern which comprises some guard bands.

Further, this invention is not limited to these embodiments but various variations and modifications may be made without departing from the scope of the invention.

What is claimed is:

1. A tracking control system in a magnetic recording and/or reproducing apparatus said tracking control system comprising, in a recording mode:

recording means for recording an information signal on a magnetic medium by two rotary recording magnetic heads having gaps of mutually different azimuth angles, said two heads successively and alternately scanning said medium;

supplying means for supplying burst signals having a predetermined frequency together with the information signal to the recording magnetic heads so that portions of the burst signals are recorded in a main track on the magentic medium which one of the recording magnetic heads scans and in the two tracks adjacent to the main track, the two tracks being successively shifted in the longitudinal diretion;

said tracking control system comprising in a reproducing mode:

reproducing means for reproducing the recorded information signal together with the burst signals from the magnetic medium by a successive scanning of said magnetic medium by two rotary reproducing magnetic heads having gaps with azimuth angles which are respectively equal to the azimuth angles of the two rotary recording heads;

separating means for separating the burst signals from the output signal of said reproducing means;

detecting means responsive to the output signal of said separating means for detecting the burst signals which are reproduced by one of the reproducing magnetic heads from the track recorded with an azimuth angle which is the same as the azimuth angle of said one of the reproducing magnetic heads and are reproduced by the other of the reproducing magnetic heads from the track recorded with an azimuth angle which is the same as the azimuth angle of the other of the reproducing magnetic heads;

extracting means responsive to the output signals of said detecting means for extracting from the output signal of said separating means the burst signals which are reproduced by said one of the reproducing magnetic heads from the tracks recorded with the azimuth angle which is different from the azimuth angle of said one of the reproducing magnetic heads and are reproduced by the other of the reproducing magnetic heads from the tracks recorded with the azimuth angle which is different from the azimuth angle of the other of the reproducing magnetic heads;

producing means responsive to the extracted burst signals from said extracting means for producing a tracking error signal; and controlling means for controlling the relative scanning phase of the reproducing magnetic heads with respect to the track of the magnetic medium according to the tracking error signal; and said predetermined frequency of the burst signals being such that the level of the burst signals reproduced by said one of the reproducing magnetic heads from the track recorded with an azimuth angle which is the same as the azimuth angle of said one of the reproducing magnetic heads is higher than the level of the burst signals reproduced by said one of the reproducing magnetic heads from the track recorded with the azimuth angle which is different from the azimuth angle of said one of the reproducing magnetic heads, and the level of the burst signal reproduced by the other of the reproducing magnetic heads from the track recorded with an azimuth angle which is the same as the azimuth angle of the other of the reproducing magnetic heads is higher than the level of the burst signals reproduced by the other of the reproducing magnetic heads from the track recorded with the azimuth angle which is different from the azimuth angle of the other of the reproducing magnetic heads.

2. A system as claimed in claim 1 in which said recording magnetic heads comprise a first magnetic head having a gap with an azimuth angle inclined in one direction by an angle $\alpha$ with respect to the direction of the track width, and a second magnetic head having a gap with an azimuth angle inclined in a reverse direction by an angle $\beta$ with respect to the direction of the track width, and said predetermined frequency f of said burst signal is a frequency which satisfies the equation $$f = \frac{nV}{T(\tan\alpha + \tan\beta)},$$

where V, T, and n respectively are the relative speed (meters per second) between the magnetic medium and the recording magnetic heads, the track width (meters), and an integer.

3. A system as claimed in claim 2 in which the value of n is a value such that said predetermined frequency f of said burst signals is described by the equation $$f = \frac{nV}{T(\tan\alpha + \tan\beta)}.$$

4. A system as claimed in claim 1 in which said recording magnetic heads comprise first and second magnetic heads respectively having gaps with azimuth angles inclined by an angle $\alpha$ in mutually opposite directions with respect to the direction of the track width, and said predetermined frequency f of said burst signals is a frequency which satisfies the equation $$f = \frac{V}{2T\tan\alpha},$$

where V and T respectively are the relative speed (meters per second) between the magnetic medium and the recording magnetic heads, and the track width (meters).

5. A system as claimed in claim 1 in which said information signal is a video signal having a horizontal synchronizing signal, said supplying means supplies said burst signals which are multiplexed with said video signal, within the horizontal blanking period of said video signal.

6. A system as claimed in claim 1 in which said reproducing means comprises a motor which rotates said reproducing magnetic heads, and said controlling means controls the rotational phase of said motor responsive to a use of said tracking error signal.

7. A system as claimed in claim 6 which further comprises a head moving mechanism for varying the height positions of said reproducing magnetic heads, and signal supplying means for supplying to said head moving mechanism the instantaneous value component or the AC error signal component of said tracking error signal obtained from each of the tracks.

8. A system as claimed in claim 1 in which said extracting means comprises means responsive to the output signal of said detecting means for generating a pair of gating pulses, a pair of gating means respectively responsive to the pair of gating pulses for gating from the output signal of said separating means the burst signals which are reproduced by said one of the reproducing magnetic heads from the track adjacent to one side of the track recorded with an azimuth angle which is the same as the azimuth angle of said one of the reproducing magnetic heads and are reproduced by the other of the reproducing magnetic heads from the track adjacent to said one side of the track recorded with an azimuth angle which is the same as as the azimuth angle of the other of the reproducing magnetic heads, and the burst signals which are reproduced by said one of the reproducing magnetic heads from the track adjacent to the other side of the track recorded with an azimuth angle which is the same as the azimuth angle of said one of the reproducing magnetic heads and are reproduced by the other of the magnetic heads from the track adjacent to the other side of the track recorded with an azimuth angle which is the same as the azimuth angle of the other of the reproducing magnetic heads respectively, and a pair of detection means for respectively detecting the output signals of said pair of gating means; and said producing means comprising a differential amplifier which is supplied with the output signals of said pair of detection means and produces said tracking error signal as output.

* * * * *